(12) United States Patent
Chiera et al.

(10) Patent No.: US 11,686,278 B2
(45) Date of Patent: Jun. 27, 2023

(54) HIGH EFFICIENCY EXHAUST GAS RETURN SYSTEM

(71) Applicant: Woodward, Inc., Fort Collins, CO (US)

(72) Inventors: Domenico Chiera, Fort Collins, CO (US); Gregory James Hampson, Boulder, CO (US); Rohit Deepak Vaidya, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/452,534

(22) Filed: Oct. 27, 2021

(65) Prior Publication Data
US 2022/0136465 A1     May 5, 2022

Related U.S. Application Data (60) Provisional application No. 63/107,706, filed on Oct. 30, 2020.

(51) Int. Cl.
*F02M 26/36*     (2016.01)
*F02M 26/22*     (2016.01)
(Continued)

(52) U.S. Cl.
CPC ......... *F02M 26/36* (2016.02); *B01F 25/4335* (2022.01); *F02M 26/06* (2016.02);
(Continued)

(58) Field of Classification Search
CPC ........ F02M 26/42; F02M 26/10; F02M 26/19; F02M 26/22; F02M 26/36
See application file for complete search history.

(56) References Cited

U.S. PATENT DOCUMENTS 5,611,203 A     3/1997    Henderson et al.
6,062,027 A *   5/2000    Landfahrer ............ F02M 26/28
                                                    60/605.2
(Continued)

FOREIGN PATENT DOCUMENTS

CN       111894766 A   *   11/2020
DE         19857578        6/1999
(Continued)

OTHER PUBLICATIONS

PCT International Search Report and Written Opinion in International Appln. No. PCT/US2021/057244, dated Mar. 2, 2022, 14 pages.

*Primary Examiner* — Ngoc T Nguyen
(74) *Attorney, Agent, or Firm* — Fish & Richardson P.C.

(57) ABSTRACT

The subject matter of this specification can be embodied in, among other things, a gas mixer that includes a convergent-divergent nozzle comprising a convergent portion and a divergent portion and defining a first gas flow path, an air housing comprising an air inlet configured to supply air to the first gas flow path upstream of the convergent-divergent nozzle, a gas housing defining a second gas flow path and including a first gas inlet configured to receive a secondary gas and allow the secondary gas into a second gas flow path, and a gas nozzle positioned parallel to and centrally within the first gas flow path in a convergent portion of the convergent-divergent nozzle, the gas nozzle configured to supply the secondary gas to the first gas flow path upstream of the divergent portion.

14 Claims, 4 Drawing Sheets

(51) Int. Cl.
*F02M 26/10* (2016.01)
*F02M 26/42* (2016.01)
*F02M 26/06* (2016.01)
*F02M 26/14* (2016.01)
*F02M 26/17* (2016.01)
*B01F 25/433* (2022.01)
*F02M 35/10* (2006.01)

(52) U.S. Cl.
CPC ............ *F02M 26/10* (2016.02); *F02M 26/14* (2016.02); *F02M 26/17* (2016.02); *F02M 26/22* (2016.02); *F02M 26/42* (2016.02); *F02M 35/10222* (2013.01); *F02M 35/10262* (2013.01)

(56) References Cited

U.S. PATENT DOCUMENTS

| 8,001,780 B2 * | 8/2011 | Onodera ............... F02B 37/025 |
| | | 60/611 |
| 2015/0267650 A1 | 9/2015 | Siuchta et al. |
| 2019/0093604 A1 | 3/2019 | Hampson et al. |

FOREIGN PATENT DOCUMENTS

| DE | 102008050368 | 4/2010 | |
| WO | WO-0190560 A1 * | 11/2001 | ......... F02M 25/0704 |

\* cited by examiner

HIGH EFFICIENCY EXHAUST GAS RETURN SYSTEM

CROSS-REFERENCE TO RELATED PATENT APPLICATIONS

This application claims the benefit of U.S. Provisional Application No. 63/107,706, filed Oct. 30, 2020, the contents of which are incorporated by reference herein.

TECHNICAL FIELD

This disclosure relates to exhaust recirculation (EGR) systems for internal combustion engines.

BACKGROUND

Exhaust gas recirculation, especially cooled EGR (cEGR), can be added to internal combustion engine systems to reduce NOx emissions and reduce knock tendency. In such a system, an amount of exhaust gas is added to the air and/or fuel mixture within the air-intake manifold of the engine. The challenge is that there is a cost to deliver the cEGR, especially for high efficiency engines that generally are most efficient when the exhaust manifold pressure is lower than the intake manifold pressure. The pressure difference creates a positive scavenging pressure difference across the engine that scavenges burn gas from the cylinder well and provides favorable pressure-volume pumping loop work. It is particularly challenging to deliver cEGR from its source at the exhaust manifold to the intake manifold without negatively impacting the residual gas scavenging and efficiency of the engine cycle via the pumping loop. The "classic" high pressure loop cEGR system plumbs the exhaust gas directly to the intake manifold, which requires either design or variable turbocharging to force the engine exhaust manifold pressure to be higher than the intake manifold, which in turn, unfavorably reduces scavenging of hot burned gases and engine P-V cycle and loses efficiency. It is particularly counterproductive since the purpose of the cEGR is to reduce the knock tendency to improve efficiency and power density. But, this classic method to drive EGR actually increases the knock tendency through residual gas retention and reduces efficiency thru negative pressure work on the engine—in a manner of diminishing returns, i.e., two steps forward to reduce knock with cEGR, but one step back due to how it is pumped, leading to a zero gain point where the cost of driving cEGR counteracts the benefits of delivering it.

SUMMARY

In general, disclosure describes technologies relating to recirculating exhaust gas.

In an example embodiment, a gas mixer includes a convergent-divergent nozzle having a convergent portion and a divergent portion and defining a first gas flow path, an air housing having an air inlet configured to supply air to the first gas flow path upstream of the convergent-divergent nozzle, a gas housing defining a second gas flow path and having a first gas inlet configured to receive a secondary gas and allow the secondary gas into a second gas flow path, and a gas nozzle positioned parallel to and centrally within the first gas flow path in a convergent portion of the convergent-divergent nozzle, the gas nozzle configured to supply the secondary gas to the first gas flow path upstream of the divergent portion.

Various embodiments can include some, all, or none of the following features. The gas housing can include a second gas inlet for allowing secondary gas into an interior of the gas housing. The first gas inlet can be configured to receive exhaust gasses from a first cylinder of an engine, and the second gas inlet can be configured to receive exhaust gasses from a second cylinder of the engine, wherein the first cylinder and the second cylinder alternatingly provide exhaust gasses during operation of the engine. The first gas inlet can be in fluidic communication with a first exhaust manifold and the second gas inlet can be in fluidic communication with a second exhaust manifold. The gas mixer can include a check valve configured to prevent backflow in the first gas inlet and the second gas inlet. The check valve can include a valve that is configured to block gas flow along the second gas inlet based on gas flow along the first gas inlet, and is configured to block gas flow along the first gas inlet based on gas flow along the second gas inlet. The gas mixer can include a fuel inlet coupled to the gas mixer and having a fuel inlet tube positioned parallel to and centrally within the second gas flow path, the fuel inlet tube configured to supply fuel into the second gas flow path upstream of the gas nozzle.

In another example embodiment, an engine system includes an intake manifold configured to receive a combustible mixture configured to be combusted within a combustion chamber, a throttle upstream of the intake manifold, the throttle configured to at least partially regulate an air flow into the intake manifold, an exhaust manifold configured to receive combustion products from the combustion chamber, and an gas mixer downstream of the throttle and upstream of the intake manifold, the gas mixer including a convergent-divergent nozzle comprising a convergent portion and a divergent portion and defining a first gas flow path, an air housing having an air inlet configured to supply air to the first gas flow path upstream of the convergent-divergent nozzle, a gas housing defining a second gas flow path and including a first gas inlet configured to receive a secondary gas and allow the secondary gas into a second gas flow path, and a gas nozzle positioned parallel to and centrally within the first gas flow path in a convergent portion of the convergent-divergent nozzle, the gas nozzle configured to supply the secondary gas to the first gas flow path upstream of the divergent portion.

Various embodiments can include some, all, or none of the following features. The first gas inlet can be configured to receive exhaust gas recirculation gasses from the exhaust manifold. The gas mixer can include a second gas inlet, and the exhaust manifold can include a first exhaust gas sub-manifold in fluidic communication with the first gas inlet, and a second exhaust gas sub-manifold in fluidic communication with the second gas inlet. The first exhaust gas sub-manifold can be configured to receive exhaust gasses from a first cylinder of the engine system, and the second exhaust gas sub-manifold can be configured to receive exhaust gasses from a second cylinder of the engine system, where the first cylinder and the second cylinder can be configured to alternatingly provide exhaust gasses during operation of the engine system. The engine system can include a check valve configured to prevent backflow in the first gas inlet and the second gas inlet. The check valve can include a valve that is configured to block gas flow along the second gas inlet based on gas flow along the first gas inlet, and is configured to block gas flow along the first gas inlet based on gas flow along the second gas inlet. The engine system can include a compressor upstream of the throttle, the compressor configured to increase a pressure within the first gas flow path. The engine system can include a turbine downstream of the exhaust manifold, the turbine being coupled to the compressor and configured to rotate the compressor. The engine system can include an exhaust gas cooler positioned within a flow path between the exhaust manifold and the gas mixer, the exhaust gas cooler configured to lower a temperature of exhaust gas prior to the gas mixer. The gas mixer can include a fuel inlet coupled to the gas mixer having a fuel inlet tube positioned parallel to and centrally within the second gas flow path, the fuel inlet tube configured to supply fuel into the second gas flow path upstream of the gas nozzle.

The systems and techniques described here may provide one or more of the following advantages. First, a system can provide high engine power density. Second, the system can provide increased engine efficiency by reducing engine exhaust pumping work associated with turbocharging. Third, the system can produce nearly zero emissions. Fourth, the system can reduce methane slip ($CH_4$) within the knock limit constraints of an engine. Fifth, the system can enable engine operations with increased use of exhaust gas recirculation.

The details of one or more implementations are set forth in the accompanying drawings and the description below. Other features and advantages will be apparent from the description and drawings, and from the claims.

DETAILED DESCRIPTION

The technical goal of gas engine development is to achieve high efficiency and high power density, but with nearly zero emissions, especially no methane slip ($CH_4$) within the knock limit constraints of the gas engine. High efficiency gas engines use excess of air to reduce NOx and increase efficiency. While lean engines are able to meet NOx level and efficiency, methane slip phenomena is not resolved. To reduce/eliminate methane slip a catalyst can be used. Available and economical catalyst is three-way catalyst (TWC). To use this typology of catalyst the combustion needs to be stoichiometric. To reduce combustion temperature and increase efficiency associate with stoichiometric combustions, cooled exhaust gas recirculation (EGR) gasses are used. Conventional EGR systems introduce high pumping work that result on reduction of global engine efficiency. High efficiency can be achieved with high compression ratio and forward advanced combustion phasing, and low heat transfer, and high polytropic compressive efficiency of the gas. Using high levels of EGR can achieve this goal. Thermodynamically, the more EGR that is used, the better the results up to the limits of combustion quality (e.g., burn duration, stability) deterioration.

The use of EGR can have parasitic effects on an engine system, that is, it can reduce the effective power output of an engine system as energy is required to move exhaust gas from an exhaust manifold and into an intake manifold. This is especially problematic on forced induction engines where the intake manifold pressure can be higher than the exhaust manifold pressure. Ironically, EGR is most needed when the intake manifold pressure is high, such as when the engine is running at high load. In the case of a turbo-charged engine, increased backpressure within the exhaust manifold can also contribute to knock under high loads.

The concepts herein relate to an EGR system that can be used on an internal combustion engine, including a forced induction internal combustion engine. A jet pump is added to the air intake system of the engine between the throttle and the intake manifold. If a compressor is provided in the intake system, the jet pump can be placed downstream of the compressor (although it could alternatively be placed upstream of the compressor, too). Recirculated exhaust gas or other gasses (e.g., ammonia, hydrogen) is flowed through a central flow path of the jet pump from the throttle towards the intake manifold. In a low-pressure receiver region within the jet pump, air is added to the stream from the exhaust manifold. The lower effective pressure in the receiver allows for a pressure differential to form between the gas (e.g., exhaust or other gas) manifold and the receiver. The reverse Bernoulli Effect recovers the pressure by slowing down the high velocity/low pressure gas to create a pressure in the intake manifold that is equal to or higher than the gas manifold. So at the system level, the jet pump enables the gasses from the gas manifold to flow to the intake manifold even when the gas manifold is at a lower pressure. Fuel can be added to the air stream upstream of the convergent end of a convergent nozzle. Turbulence is produced as the three streams combine within the jet pump leading to a well-mixed, combustible mixture flowing into the intake manifold.

Figure 1:
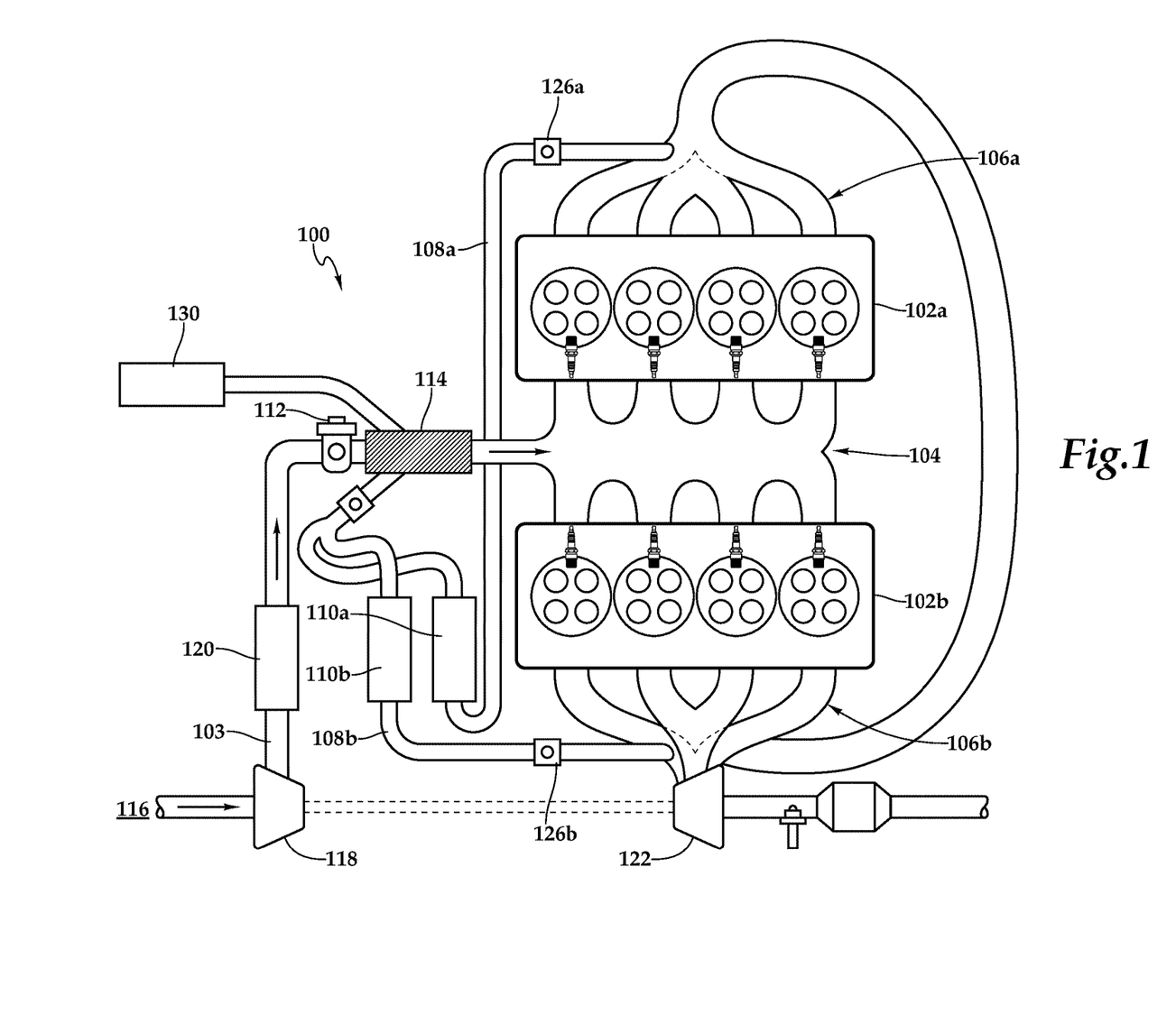
FIG. 1 is a schematic diagram of an example internal combustion engine system.

FIG. 1 shows an example engine system 100. The engine system 100 includes an intake manifold 104 configured to receive a combustible mixture to be combusted within a combustion chamber of the engine 100. That is, the intake manifold 104 is fluidically coupled to a source of oxygen (e.g., air) and a source of fuel. The combustible mixture can include air and any combustible fluid, such as natural gas, atomized gasoline, or diesel. The engine system 100 includes a cylinder bank 102a having four cylinders and a cylinder bank 102b having four cylinders. While the illustrated implementation includes an eight-cylinder engine having two banks of four cylinders, the engine system 100 can have any appropriate number of banks having any appropriate number of cylinders. Also, while the illustrated example is depicted and described as a piston engine, aspects of this disclosure can be applied to other types of internal combustion engines, such as rotary engines or gas turbine engines.

A throttle 112 is positioned in an intake plenum 103 upstream of the intake manifold 104. The throttle 112 is configured to regulate an air flow into the intake manifold 104 through the intake plenum 103 from the ambient environment 116, for example, by changing a cross-sectional area of a flow passage going through the throttle 112. In some implementations, the throttle 112 can include a butterfly valve or a disc valve. Reducing the cross-sectional area of the flow passage through the throttle 112 reduces the flowrate of air flowing through the throttle 112 towards the intake manifold 104.

An exhaust manifold 106a is configured to receive combustion products (exhaust) from a combustion chamber of the cylinder bank 102a. That is, the exhaust manifold 106a is fluidically coupled to outlets of the combustion chambers of the cylinder bank 102a. An EGR flow passage 108a or conduit fluidically connects the exhaust manifold 106a and a gas mixer 114. In the illustrated implementation, an EGR throttle valve 126a is located within the EGR flow passage 108a between the exhaust manifold 106a and the gas mixer 114 and is used to regulate the EGR flow. The EGR throttle valve 126a regulates the EGR flow by adjusting a cross-sectional area of the EGR flow passage 108a going through the EGR throttle valve 126a. In some implementations, the EGR throttle valve 126a can include a butterfly valve, a disc valve, a needle valve, or another style of valve.

An exhaust gas cooler 110a is positioned in the EGR flow passage 108a between the exhaust manifold 106a and the gas mixer 114. The exhaust gas cooler 110a can operate to lower a temperature of the exhaust gas prior to entering the gas mixer 114. The exhaust gas cooler 110a is a heat exchanger, such as an air-air exchanger or an air-water exchanger.

An exhaust manifold 106b is configured to receive combustion products (exhaust) from a combustion chamber of the cylinder bank 102b. That is, the exhaust manifold 106b is fluidically coupled to outlets of the combustion chambers of the cylinder bank 102b. An EGR flow passage 108b or conduit fluidically connects the exhaust manifold 106b and the gas mixer 114. In the illustrated implementation, an EGR throttle valve 126b is located within the EGR flow passage 108b between the exhaust manifold 106b and the gas mixer 114 and is used to regulate the EGR flow. The EGR throttle valve 126b regulates the EGR flow by adjusting a cross-sectional area of the EGR flow passage 108b going through the EGR throttle valve 126b. In some implementations, the EGR throttle valve 126b can include a butterfly valve, a disc valve, a needle valve, or another style of valve.

An exhaust gas cooler 110b is positioned in the EGR flow passage 108b between the exhaust manifold 106b and the gas mixer 114. The exhaust gas cooler 110b can operate to lower a temperature of the exhaust gas prior to entering the gas mixer 114. The exhaust gas cooler 110b is a heat exchanger, such as an air-air exchanger or an air-water exchanger.

In the illustrated example, the engine system 100 is configured such that substantially only one of the cylinder banks 102a and 102b receives exhaust gasses at any particular time. For example, a cylinder of the cylinder bank 102a can be in the exhaust stroke while the cylinders of the cylinder bank 102b are in their intake, compression, or combustion strokes, and similarly a cylinder of the cylinder bank 102b can be in the exhaust stroke while the cylinders of the cylinder bank 102a are in their intake, compression, or combustion strokes. In other words, in some embodiments, the engine system 100 can be configured such that EGR gasses flow as pulses that alternate between the EGR flow passage 108a and the EGR flow passage 108b.

The EGR flow passages 108a and 108b feed into the gas mixer 114. The gas mixer 114 is located downstream of a throttle 112 and upstream of the intake manifold 104 in the illustrated example. The gas mixer 114 is in the engine intake system, fluidically connected to the throttle 112, the intake manifold 104, and the EGR flow passages 108a and 108b. While the illustrated example depicts and describes the engine system 100 has having two EGR flow passages, in some embodiments the engine system can have one, two, three, four, or any other appropriate number of ENG flow passages. The fluid connections can be made with conduits containing flow passages that allow fluid flow. In some implementations, the gas mixer 114 can be included within a conduit connecting the intake manifold 104 to the throttle 112, within the intake manifold 104 itself, within the EGR flow passages 108a and/or 108b, integrated within the throttle 112, or integrated into the EGR throttle valves 126a and/or 126b. Details about example EGR mixers are described later within this disclosure.

In some implementations, the engine system 100 includes a compressor 118 upstream of the throttle 112. In an engine with a compressor 118 but no throttle, such as an unthrottled diesel engine, the throttle 112 is not needed and the gas mixer 114 can be down stream of the compressor 118. The compressor 118 can include a centrifugal compressor, a positive displacement compressor, or another type of compressor for increasing a pressure within the air in the intake plenum 103 during engine operation.

In the illustrated example, the compressor 118 is a part of a turbocharger. That is, a turbine 122 is located downstream of the exhaust manifolds 106a and 106b and rotates as the exhaust gases expand through the turbine 122. The turbine 122 is coupled to the compressor 118, for example, via a shaft and imparts rotation on the compressor 118. While the illustrated example depicts and describes a turbocharger to increase the intake manifold pressure, other methods of compression can be used, for example an electric or engine powered compressor (e.g., supercharger).

The engine system 100 includes an intercooler 120 that is configured to cool the compressed air in the intake plenum 103 prior to the air entering the gas mixer 114 and the intake manifold 104. An exhaust gas cooler 110a is positioned in the EGR flow passage 108a between the exhaust manifold 106a and the gas mixer 114. An exhaust gas cooler 110b is positioned in the EGR flow passage 108b between the exhaust manifold 106b and the gas mixer 114. The exhaust gas coolers 110a, 110b can operate to lower a temperature of the exhaust gas prior to the EGR mixer. The exhaust gas coolers 110a, 110b are heat exchangers, such as an air-air exchanger or an air-water exchanger.

In some embodiments, other gasses or additives can be mixed with, or used in place of, the EGR gasses. For example, pressurized ammonia, hydrogen, methane, or any other appropriate substance can be added to the EGR gasses upstream of the gas mixer. In another example, pressurized ammonia, hydrogen, methane, or any other appropriate substance can be provided to the gas mixer 114 entirely in place of the EGR gasses.

A fuel supply 130 is configured to provide fuel for combustion in the engine system 100 (e.g., in the cylinders of the cylinder banks 102a and 102b). In the illustrated example, the fuel supply 130 is configured to supply fuel to the gas mixer 114. An example of such a configuration is discussed in more detail in the description of FIG. 2. In some embodiments, the fuel supply 130 can be configured to supply fuel to the intake plenum 103 (e.g., upstream of the throttle 112 and/or the gas mixer 114). In some embodiments, the fuel supply 130 can be configured to supply fuel downstream from the gas mixer 114 (e.g., to the intake manifold 104, through direct injection into the cylinders).

In some embodiments, the fuel supply 130 can be a high-pressure fuel supply. For example, the fuel supply can be configured to provide pressurized gaseous ammonia, hydrogen, methane, or any other appropriate combustible gas. In another example, the fuel supply can be configured to provide liquefied ammonia, hydrogen, methane, or any other appropriate combustible gas that can be stored and/or provided in a liquefied form.

Figure 2:
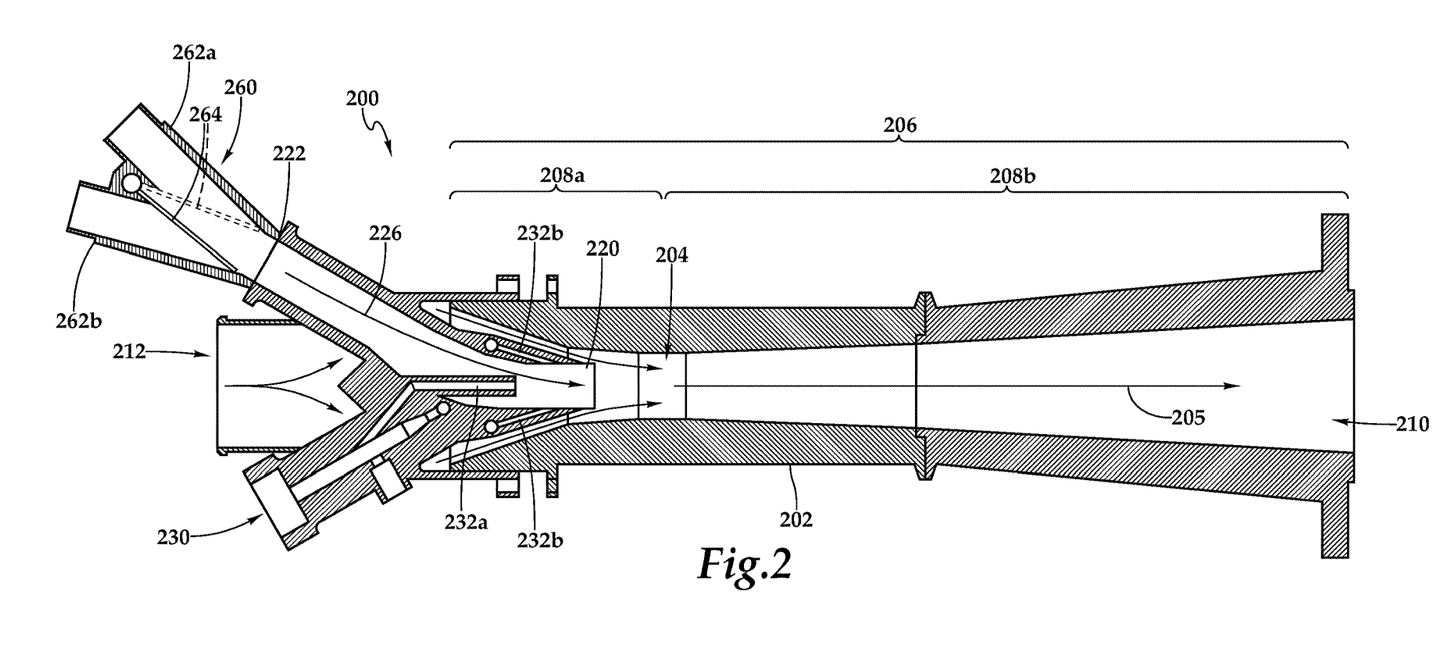
FIG. 2 is a half cross-sectional view of an example gas mixer.

FIG. 2 is a half cross-sectional view of an example gas mixer 200. In some embodiments, the gas mixer 200 can be the gas mixer 114 of FIG. 1. The gas mixer 200 includes a gas housing 202 that defines a mixing chamber 204 having an air flow path 205. The mixing chamber 204 is configured as a convergent-divergent nozzle 206 having a conically convergent portion 208a in which the air flow path 205 becomes constricted, and a conically divergent portion 208b in which the air flow path 205 expands to an outlet 210. In some implementations, the outlet 210 can be fluidically connected to an intake manifold such as the example intake manifold 104 of FIG. 1.

The gas mixer 200 includes an air inlet 212 to the convergent-divergent nozzle 206. In some implementations, the air inlet 212 can be fluidically connected to an intake plenum, such as the example intake plenum 103 of FIG. 1. The conically convergent portion 208a defines an air nozzle for incoming air flow. In general, air flows in through the air inlet 212 upstream of the convergent-divergent nozzle 206, converges in the conically convergent portion 208a, expands in the conically divergent portion 208b, and exits through the outlet 210, all along the air flow path 205. The conically convergent portion 208a converges in the direction of flow toward a convergent end. That is, the downstream end (outlet) of the conically convergent portion 208a has a smaller cross-sectional area (e.g., a smaller flow area) than the upstream end (air inlet 212). The conically divergent portion 208b diverges in the direction of flow toward a divergent end proximal the outlet 210. That is, the downstream end (outlet 210) of the conically divergent portion 208b has a larger cross-sectional area (e.g., a smaller flow area) than the upstream end.

The narrowing of the conically convergent portion 208a increases a flow velocity of air flow as it passes along the air flow path 205. In the conically divergent portion 208b, the cross-section of the flow passage along the air flow path 205 increases. The increase in cross-sectional area slows the flow velocity and raises the pressure of the fluid flow. In certain instances, the increase in cross-sectional area can be sized to increase a pressure within the gas mixer 200 so that the pressure drop across the gas mixer 200 is zero, nominal or otherwise small. In some embodiments, the convergent-divergent nozzle 206 can include threads or another form of removable attachment (e.g., a hose clamped around a flange) at the air inlet 212, the outlet 210, or both to allow the convergent-divergent nozzle 206 to be installed and fluidically connected to the remainder of the intake of the engine system 100. Likewise, in some embodiments, the conically convergent portion 208a and the conically divergent portion 208b can be modularly interchangeable each other and/or with gas nozzles 220 of different geometries and configurations to make the system readily changeable to fit multiple engine applications.

The gas mixer 200 includes a gas nozzle 220 and a gas inlet 222. The gas inlet 222 is configured to receive a flow of a secondary gas (e.g., EGR gasses) and define a secondary gas flow path 226 through the gas nozzle 220. The gas nozzle 220 is positioned parallel to and centrally within the air flow path 205 and configured to supply the secondary gas (e.g., flowing along the secondary gas flow path 226) to the air flow path 205 within the convergent portion 208a of the convergent-divergent nozzle 206, upstream from the divergent portion 208b. The gas nozzle is configured to define a flow of secondary gas that is complimentary (e.g., cooperative, substantially parallel) to the flow of air along the air flow path 205.

In some embodiments, the convergent-divergent nozzle 206 can be modularly interchangeable with convergent-divergent nozzles 206 of different geometries, making the system readily changeable to fit multiple engine applications. For example, the convergent-divergent nozzle 206 can be provided with threads or another form of removable attachment to the remainder of the gas housing 202. The illustrated example shows the conically convergent portion 208a, the conically divergent portion 208b, and the convergent-divergent nozzle 206 aligned at a same center axis, but in some embodiments, these components may not be aligned or parallel. For example, space constraints may require the gas mixer 200 to have an angle between the axis of the conically convergent portion 208a and the conically divergent portion 208b. In some embodiments, rather than having a substantially straight flow passage as shown in FIG. 2, the flow passage may be curved.

The gas mixer includes a fuel inlet 230 configured to receive fuel from a fuel supply such as the example fuel supply 130 of FIG. 1. The fuel inlet 230 is fluidically connected to a collection of fuel inlet tubes 232a and 232b. The fuel inlet tubes 232a and 232b are configured as fuel nozzles to supply fuel into the second flow path upstream of the convergent nozzle to supply fuel to the secondary gas flow path 226. The fuel inlet tube 232a is positioned parallel to and centrally within the second flow path, the fuel inlet tube configured to supply fuel into the secondary gas flow path 226 upstream of the gas nozzle 220. The fuel inlet tubes 232b are positioned about the inner periphery of the gas nozzle 220 and are configured to supply fuel in the secondary gas flow path 226 proximal to the outlet of the gas nozzle 220. The fuel inlet tubes 232a-232b are configured to define flows of fuel that are complimentary (e.g., cooperative, substantially parallel) to the flow of secondary gas along the secondary gas flow path 226. In some embodiments, the fuel can be received at high pressure (e.g., 4-12 bar liquefied natural gas). As the fuel exits the fuel inlet tubes 232a-232b, the fuel flow helps drive the secondary gas flow.

In some implementations, the fuel inlet 230 can be a gaseous fuel inlet, coupled to a source of gaseous fuel. However, the fuel delivered by the fuel inlet 230 can include any combustible fluid, such as natural gas, gasoline, or diesel. While shown as a single tube, the fuel inlet 230 can be configured in other ways, for example as a cross through the flow area of the mixer, as fuel delivery holes along the perimeter of the flow area, or in another manner. While the illustrated example shows the fuel inlet tubes 232a-232b configured to inject fuel upstream of the divergent portion 208b, fuel can also be added with a fuel supply port upstream of the air inlet 212 or the gas inlet 222. Such a port can include a gaseous fuel supply port. In some instances, the fuel can be delivered at high velocity, with velocities up to including sonic flow at the outlets of the fuel inlet tubes 232a-232b, such that a fuel-gas jet pump is created, allowing the fuel to provide additional motive force for the secondary gas flow path 226 into and through the gas nozzle 220. In such examples, the higher pressures can generate a sonic jet that can further enhance the mixing of the fuel and air. In some implementations, this can reduce the need for a fuel pressure regulator. Additionally, if the fuel jet is cold via the Joules-Thompson effect, this cooling effect can cool the air/fuel stream, thus reducing the size and/or need for intake cooling (e.g., the intercooler 120).

In some implementations, the fuel inlet 230 can be a high pressure fuel inlet. For example, high pressure gaseous fuel (e.g., $H_2$, $NH_3$, or methanol or other low carbon fuel at about 10 to 500 bar gas pressure) can be provided through the fuel inlet tubes 262a-262b to help accelerate the air flow. In another example, liquefied gaseous fuel (e.g., liquefied natural gas, $NH_3$, $H_2$) can be heated under liquid conditions and then provided through the fuel inlet tubes 262a-262b, where the liquefied gaseous fuel can be injected into the air or EGR streams and "flashed" to create a very high velocity (e.g., sonic) jet so the heat addition increases the pumping effect.

In some implementations, the gas mixer 200 can be used in alternative configurations. For example, EGR is typically not used in diesel engine applications. However, other gasses such as ammonia can be supplied as a secondary gas at the gas inlet 222 and combined with diesel fuel flowing through the fuel inlet tubes 232a-232b to accelerate the ingestion of air. In a particular example, ammonia can be provided at 50 bar and combined in the gas mixer 200 to create a stoichiometric mixture (e.g., 15% ammonia and 85% air).

The gas mixer 200 also includes a check valve 260 with two gas inlets. The check valve 260 includes a gas inlet 262a and a gas inlet 262b. The gas inlet 262a is configured to receive secondary gasses (e.g., EGR) from a first source, such as the example EGR flow passage 108a. The gas inlet 262b is configured to receive secondary gasses (e.g., EGR) from a second, different source, such as the example EGR flow passage 108b. In some embodiments, fuel inlet tubes 262a-262b can include threads or another form of removable attachment (e.g., a hose clamped around a flange) at the fuel inlet tubes 262a-262b, the gas inlet 222, or any of these to allow the check valve 260 to be installed and fluidically connected to the remainder of the EGR system of the engine system 100.

In some embodiments, the gas mixer 200 can be fluidically connected to an engine system that is configured such that secondary (e.g., EGR) gasses flow as pulses that alternate between the gas inlet 262a and the gas inlet 262b. For example, the gas inlet 262a can be in fluidic communication with a first cylinder and the gas inlet 262b can be in fluidic communication with a second, different cylinder, and the first cylinder can be configured to exhaust while the second is not, and vice versa.

The check valve 260 also includes a valve 264. The valve 264 is configured as a flapper valve in which a pivoting valve body in which gas flow through one of the gas inlets 262a and 262b pushes the valve body open for the flowing gas inlet and block the other, preventing backflow from the gas inlet 262a to the gas inlet 262b, and preventing backflow from the gas inlet 262b to the gas inlet 262a. While the valve 264 is a flapper valve in the illustrated example, other forms of backflow-preventing valves can be used, such as check valves.

The gas nozzle 220 is configured to provide a high velocity gas path. The secondary gas flow path 226 is aerodynamically efficient to maintain a high velocity (e.g., from the exhaust manifolds 106a-106b). This enables the full total pressure of the secondary gas flow (e.g., static pressure plus dynamic pressure due to velocity). The fuel flow through the fuel inlet tubes 232a-232b adds additional momentum to the secondary gas flow along the secondary gas flow path 226. The secondary gas (e.g., EGR) and the fuel join to become a combined primary jet to create suction for the air flowing along the air flow path 205. This is a reversal of previous jet pumps where the air and fuel were combined as a primary flow in order to induce the secondary (e.g., EGR) gas flow. An example benefit of the illustrated example is that the pulse momentum of the secondary gas along the secondary gas flow path 226 accelerates the ingestion of air from the air inlet 212. In implementations in which the air flow is also pumped with its own high velocity, such as by the example turbine 122 of FIG. 1, the flow of the air can also provide a complementary lowering of the suction pressure as seen by the gas path, so that both flows can help to urge the flow of the other.

In some implementations, the gas mixer 200 can improve the performance of an engine. For example, by using the fuel flow and the secondary gas flow to accelerate, pump, or otherwise promote the flow of air, less compressor work may be needed from the turbine 122 to move the same amount of air. By reducing the amount of work needed of the turbine 122, the amount of backpressure in the exhaust manifolds 106a-106b can become reduced, thus reducing the power losses caused by the pumping work performed by the pistons during exhaust strokes. The gas mixer 200 can enable the use of high levels of EGR up to about 30%. Use of the gas mixer 200 can bring stoichiometric EGR engines close to lean engine in terms of efficiency, while allowed to use TWC, and as a result have near zero emissions.

In use, gas nozzle 220 and the conically convergent portion 208a increases the velocity and decreases the air pressure along the air flow path 205 in the gas mixer 200. Air is drawn along the air flow path 205 into the gas mixer 200 through the air inlet 212 in response to (e.g., because of) the decreased pressure of the jetted flow of the secondary gas exiting the gas nozzle 220. The secondary gas is directed along the secondary gas flow path 226 (e.g., from the exhaust manifolds 106a and 106b) eventually to the point downstream of the conically convergent portion 208a. The air flow, the secondary gas flow, and the fuel flow are mixed to form a combustion mixture. A pressure of the combustion mixture is increased and a velocity of the combustion mixture is reduced with a conically divergent portion 208b.

Figures 3A, 3B:
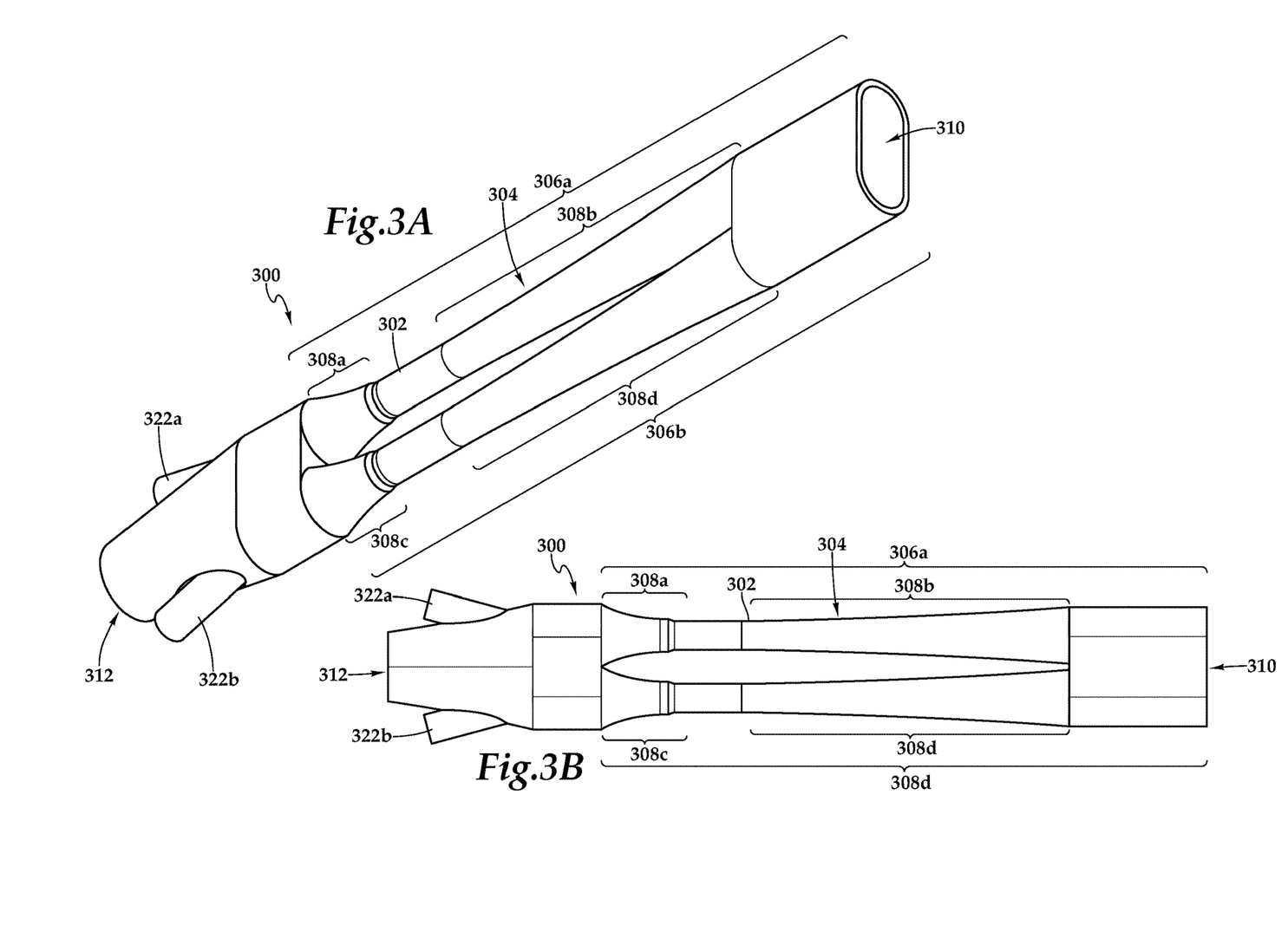
FIGS. 3A-3D are various views of another example gas mixer.
Figure 3C:
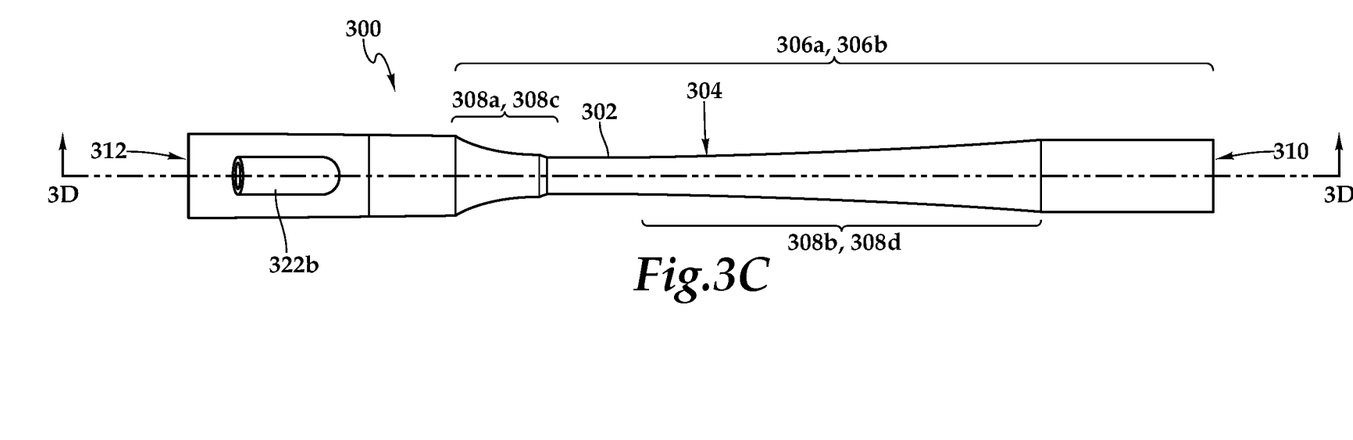
Figure 3D:
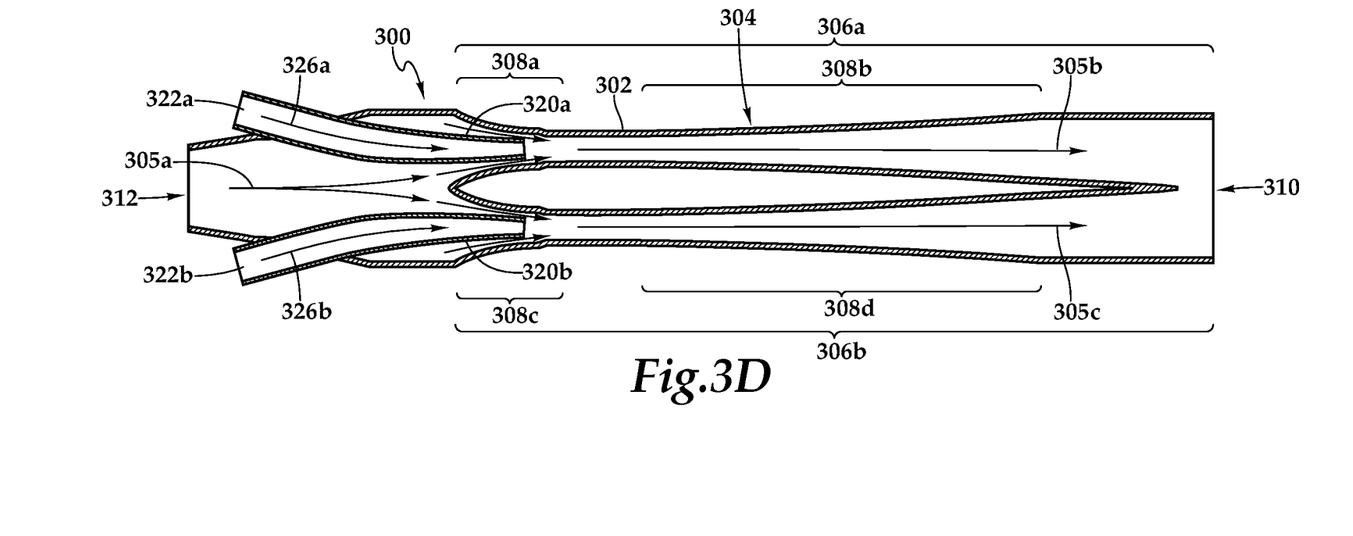

FIGS. 3A-3D show another example gas mixer 300. FIG. 3A shows a perspective view, FIG. 3B shows a top view, FIG. 3C shows a side view, and FIG. 3D shows a half cross-sectional view taken along section A-A of FIG. 3C. In some embodiments, the gas mixer 300 can be the gas mixer 114 of FIG. 1. The gas mixer 300 includes a gas housing 302 having an outlet 310, air inlet 312, a gas inlet 322a, and a gas inlet 322b. In some implementations, the air inlet 312 can be fluidically connected to an intake plenum, such as the example intake plenum 103 of FIG. 1.

Referring primarily to FIG. 3D, the gas housing 302 defines a mixing chamber 304 having an air flow path 305a that splits into an air flow path 305b and an air flow path 305c. The mixing chamber 304 is configured as a pair of convergent-divergent nozzles 306a and 306b. The nozzle 306a has a conically convergent portion 308a in which the air flow path 305b becomes constricted, and a conically divergent portion 308b in which the air flow path 305b expands to the outlet 310. The nozzle 306b has a conically convergent portion 308c in which the air flow path 305c becomes constricted, and a conically divergent portion 308d in which the air flow path 305c expands to the outlet 310. In some implementations, the outlet 310 can be fluidically connected to an intake manifold such as the example intake manifold 104 of FIG. 1.

The air inlet 312 acts as an inlet to the convergent-divergent nozzles 306a-306b. The conically convergent portions 308a and 308c define a pair of air nozzles for incoming air flow. In general, air flows in through the air inlet 312 upstream of the convergent-divergent nozzles 306a and 306b, and the gas housing 302 divides the air flow path 305a into the air flow path 305b and the air flow path 305c. The air flow path 305b converges in the conically convergent portion 308a, diverges in the conically divergent portion 308b, and exits through the outlet 310, all along the air flow path 305b. The air flow path 305c converges in the conically convergent portion 308c, diverges in the conically divergent portion 308d, and exits through the outlet 310, all along the air flow path 305c.

The gas mixer 300 includes a gas nozzle 320a that is fluidically connected to a gas inlet 322a, and a gas nozzle 320b that is fluidically connected to a gas inlet 322b. The gas inlet 322a is configured to receive a flow of a secondary gas (e.g., EGR gasses) and define a secondary gas flow path 326a through the gas nozzle 320a. The gas inlet 322b is configured to receive a flow of the secondary gas and define a secondary gas flow path 326b through the gas nozzle 320b.

The gas nozzles 320a, 320b is positioned parallel to and centrally within the air flow paths 305b, 305c and are configured to supply the secondary gas (e.g., flowing along the secondary gas flow paths 326a and 326b) to the air flow paths 305b, 305c within the convergent portions 308a, 308c of the convergent-divergent nozzles 306a, 306b, upstream from the divergent portions 308b, 308d. The gas nozzles are configured to define flows of secondary gas that are complimentary (e.g., cooperative, substantially parallel) to the flow of air along the air flow paths 305b, 305c.

The gas nozzles 320a-320b are configured to provide high velocity gas paths. The secondary gas paths 326a-326b are aerodynamically efficient to maintain a high velocity (e.g., from the exhaust manifolds 106a-106b). This enables the full total pressure of the secondary gas flow (e.g., static pressure plus dynamic pressure due to velocity). The secondary gas becomes a primary jet to create suction for the air flowing along the gas flow paths 305b-305c. An example benefit of the illustrated example is that pulse momentum of the secondary gas along the secondary gas paths 326a-326b accelerates the ingestion of air from the air inlet 312. In some implementations, the gas mixer 300 can improve the performance of an engine. For example, by using the fuel flow and the secondary gas flow to accelerate, pump, or otherwise promote the flow of air, less compressor work may be needed from the turbine 122 to move the same amount of air.

In some implementations, the example gas mixers 200 and 300 described above can improve the ability of the example engine system 100 to use carbon free fuels with slow combustion, such as ammonia (NH$_3$) or blended fuels like hydrogen blended with natural gas. In some implementations, the example gas mixers 200 or 300 can be used in dual fuel configurations like diesel and anhydrous ammonia, in which existing engines can be easily retrofitted with the gas mixers 200 or 300 to drastically reduce engine emissions.

Although a few implementations have been described in detail above, other modifications are possible. For example, the flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A gas mixer comprising:
   a convergent-divergent nozzle comprising a convergent portion and a divergent portion and defining a first gas flow path;
   an air housing comprising an air inlet configured to supply air to the first gas flow path upstream of the convergent-divergent nozzle;
   a gas housing defining a second gas flow path and comprising:
      a first gas inlet configured to receive a secondary gas and allow the secondary gas into the second gas flow path;
      a second gas inlet configured to receive the secondary gas and allow the secondary gas into the second gas flow path; and
   a flapper valve comprising a pivoting a valve body that is configured to be urged into a first configuration by gas pressure of gas flow along the first gas inlet to permit gas flow along the first gas inlet and to block gas flow along the second gas inlet, and is configured to be urged into a second configuration by gas pressure of gas flow along the second gas inlet to permit gas flow along the second gas inlet and to block gas flow along the first gas inlet based on gas flow along the second gas inlet; and,
   a gas nozzle positioned parallel to and centrally within the first gas flow path in the convergent portion of the convergent-divergent nozzle, the gas nozzle configured to supply the secondary gas to the first gas flow path upstream of the divergent portion.

2. The gas mixer of claim 1, wherein the first gas inlet is configured to receive exhaust gasses from a first cylinder of an engine, and the second gas inlet is configured to receive exhaust gasses from a second cylinder of the engine, wherein the first cylinder and the second cylinder alternatingly provide exhaust gasses during operation of the engine.

3. The gas mixer of claim 2, wherein the first gas inlet is in fluidic communication with a first exhaust manifold and the second gas inlet is in fluidic communication with a second exhaust manifold.

4. The gas mixer of claim 1, wherein the flapper valve is configured to prevent backflow in the first gas inlet and the second gas inlet.

5. The gas mixer of claim 1, further comprising a fuel inlet coupled to the gas mixer and comprising a fuel inlet tube positioned parallel to and centrally within the second gas flow path, the fuel inlet tube configured to supply fuel into the second gas flow path upstream of the gas nozzle.

6. An engine system comprising:
   an intake manifold configured to receive a combustible mixture configured to be combusted within a first combustion chamber and a second combustion chamber;
   a throttle upstream of the intake manifold, the throttle configured to at least partially regulate an air flow into the intake manifold;
   an exhaust manifold comprising a first exhaust gas sub-manifold configured to receive combustion products from the first combustion chamber and a second exhaust gas sub-manifold configured to receive combustion products from the second combustion chamber; and
   a gas mixer downstream of the throttle and upstream of the intake manifold, the gas mixer comprising:
      a convergent-divergent nozzle comprising a convergent portion and a divergent portion and defining a first gas flow path;
      an air housing comprising an air inlet configured to supply air to the first gas flow path upstream of the convergent-divergent nozzle;
      a gas housing defining a second gas flow path and comprising:
         a first gas inlet configured to receive a secondary gas from the first exhaust gas sub-manifold and allow the secondary gas into the second gas flow path;
         a second gas inlet configured to receive the secondary gas from the second exhaust gas sub-manifold and allow the secondary gas into the second gas flow path;

a flapper valve comprising a pivoting a valve body that is configured to be urged into a first configuration by gas pressure of gas flow along the first gas inlet to permit gas flow along the first gas inlet and to block gas flow along the second gas inlet, and is configured to be urged into a second configuration by gas pressure of gas flow along the second gas inlet to permit gas flow along the second gas inlet and to block gas flow along the first gas inlet based on gas flow along the second gas inlet; and, a gas nozzle positioned parallel to and centrally within the first gas flow path in the convergent portion of the convergent-divergent nozzle, the gas nozzle configured to supply the secondary gas to the first gas flow path upstream of the divergent portion.

7. The engine system of claim 6, wherein the first gas inlet is configured to receive exhaust gas recirculation gasses from the exhaust manifold.

8. The engine system of claim 6, wherein the first exhaust gas sub-manifold is configured to receive exhaust gasses from a first cylinder of the engine system, and the second exhaust gas sub-manifold is configured to receive exhaust gasses from a second cylinder of the engine system, wherein the first cylinder and the second cylinder are configured to alternatingly provide exhaust gasses during operation of the engine system.

9. The engine system of claim 6, wherein the flapper valve is configured to prevent backflow in the first gas inlet and the second gas inlet.

10. The engine system of claim 6, further comprising a compressor upstream of the throttle, the compressor configured to increase a pressure within the first gas flow path.

11. The engine system of claim 10, further comprising a turbine downstream of the exhaust manifold, the turbine being coupled to the compressor and configured to rotate the compressor.

12. The engine system of claim 6, further comprising an exhaust gas cooler positioned within a flow path between the exhaust manifold and the gas mixer, the exhaust gas cooler configured to lower a temperature of exhaust gas prior to the gas mixer.

13. The engine system of claim 6, wherein the gas mixer further comprises a fuel inlet coupled to the gas mixer comprising a fuel inlet tube positioned parallel to and centrally within the second gas flow path, the fuel inlet tube configured to supply fuel into the second gas flow path upstream of the gas nozzle.

14. The engine system of claim 6, wherein the second gas inlet is configured to receive exhaust gas recirculation gasses from the exhaust manifold.

* * * * *